US012505825B2

(12) United States Patent
Zhang et al.

(10) Patent No.: US 12,505,825 B2
(45) Date of Patent: Dec. 23, 2025

(54) SPONTANEOUS TEXT TO SPEECH (TTS) SYNTHESIS

(71) Applicant: Microsoft Technology Licensing, LLC, Redmond, WA (US)

(72) Inventors: Ran Zhang, Redmond, WA (US); Jian Luan, Beijing (CN); Yahuan Cong, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 177 days.

(21) Appl. No.: 17/926,994

(22) PCT Filed: Apr. 22, 2021

(86) PCT No.: PCT/US2021/028516
§ 371 (c)(1),
(2) Date: Nov. 21, 2022

(87) PCT Pub. No.: WO2021/257177
PCT Pub. Date: Dec. 23, 2021

(65) Prior Publication Data
US 2023/0206899 A1    Jun. 29, 2023

(30) Foreign Application Priority Data
Jun. 19, 2020 (CN) .......................... 202010566131.1

(51) Int. Cl.
*G10L 13/10* (2013.01)
*G10L 13/04* (2013.01)
(52) U.S. Cl.
CPC .............. *G10L 13/10* (2013.01); *G10L 13/04* (2013.01); *G10L 2013/105* (2013.01)

(58) Field of Classification Search
CPC .... G10L 13/10; G10L 13/04; G10L 2013/105
See application file for complete search history.

(56) References Cited

U.S. PATENT DOCUMENTS

2019/0043472 A1*  2/2019  Garcia .................. G10L 21/003
2022/0148562 A1*  5/2022  Park ...................... G10L 13/047

FOREIGN PATENT DOCUMENTS

CN   104916284 A   9/2015
CN   105551481 A   5/2016
(Continued)

OTHER PUBLICATIONS

O. Kwon, I. Jang, C. Ahn and H.-G. Kang, "Emotional Speech Synthesis Based on Style Embedded Tacotron2 Framework," 2019 34th International Technical Conference on Circuits/Systems, Computers and Communications (ITC-CSCC) (Year: 2019).*
(Continued)

*Primary Examiner* — Hai Phan
*Assistant Examiner* — Alvin Iskender
(74) *Attorney, Agent, or Firm* — Schwegman Lundberg & Woessner, P.A.

(57) ABSTRACT

The present disclosure provides methods and apparatuses for spontaneous text-to-speech (TTS) synthesis. A target text may be obtained. A fluency reference factor may be determined based at least on the target text. An acoustic feature corresponding to the target text may be generated with the fluency reference factor. A speech waveform corresponding to the target text may be generated based on the acoustic feature.

7 Claims, 7 Drawing Sheets

(56) References Cited

FOREIGN PATENT DOCUMENTS

| CN | 107945786 A | 4/2018 |
|---|---|---|
| CN | 108806665 A | 11/2018 |

OTHER PUBLICATIONS

First Office Action Received for Chinese Application No. 202010566131.1, mailed on Jan. 22, 2024, 10 pages. (English Translation Provided).

Hou, et al., "Improving Air Traffic Control Speech Intelligibility by Reducing Speaking Rate Effectively", In Proceedings of International Conference on Asian Language Processing (IALP), Dec. 5, 2017, pp. 197-200.

Kwon, et al., "Emotional Speech Synthesis Based on Style Embedded Tacotron2 Framework", In Proceedings of 34th International Technical Conference on Circuits/Systems, Computers and Communications (ITC-CSCC), Jun. 23, 2019, 4 Pages.

"International Search Report and Written Opinion Issued in PCT Application No. PCT/US21/028516", Mailed Date: Aug. 4, 2021, 12 Pages.

Wang, et al., "Style Tokens: Unsupervised Style Modeling, Control and Transfer in End-to-End Speech Synthesis", In Repository of arXiv:1803.09017v1, Mar. 23, 2018, 11 Pages.

Determination of Rejection Received for Chinese Application No. 202010566131.1, mailed on Oct. 12, 2024, 09 pages. (English Translation Provided).

Communication pursuant to Article 94(3) EPC Received for European Application No. 21725308.7, mailed on Sep. 26, 2024, 07 pages.

Muto, et al., "Pause Insertion Prediction using Evaluation Model of Perceptual Pause insertion Naturalness", Speech Prosody, vol. 7, 2014, pp. 558-562.

Communication Under Rule 71(3) EPC Received for European Application No. 21725308.7, mailed on Jul. 17, 2025, 08 pages.

Decision to grant a European patent pursuant to Article 97(1) Received for European Application No. 21725308.7, mailed on Oct. 16, 2025, 02 pages.

\* cited by examiner

SPONTANEOUS TEXT TO SPEECH (TTS) SYNTHESIS

CROSS-REFERENCE TO RELATED APPLICATION

This application is a U.S. National Stage Filing under 35 U.S.C. 371 of International Patent Application Serial No. PCT/US2021/028516, filed Apr. 22, 2021, and published as WO 2021/257177 A1 on Dec. 23, 2021, which application claims the benefit of priority to Chinese Patent Application No. 202010566131.1, filed Jun. 19, 2020, which applications and publication are incorporated herein by reference in their entirety.

BACKGROUND

Text-to-speech (TTS) synthesis intends to generate a corresponding speech waveform based on a text input. A conventional end-to-end TTS system may predict an acoustic feature based on a text input, and further generate a speech waveform based on the predicted acoustic feature.

SUMMARY

This Summary is provided to introduce a selection of concepts that are further described below in the Detailed Description. It is not intended to identify key features or essential features of the claimed subject matter, nor is it intended to be used to limit the scope of the claimed subject matter.

Embodiments of the present disclosure propose methods and apparatuses for spontaneous TTS synthesis. A target text may be obtained. A fluency reference factor may be determined based at least on the target text. An acoustic feature corresponding to the target text may be generated with the fluency reference factor. A speech waveform corresponding to the target text may be generated based on the acoustic feature.

It should be noted that the one or more aspects described above comprise the features hereinafter fully described and particularly pointed out in the claims. The following description and the drawings set forth in detail certain illustrative features of the one or more aspects. These features are only indicative of the various ways in which the principles of various aspects may be employed, and this disclosure is intended to comprise all such aspects and their equivalents.

BRIEF DESCRIPTION OF THE DRAWINGS

The disclosed aspects will hereinafter be described in connection with the appended drawings that are provided to illustrate and not to limit the disclosed aspects.

DETAILED DESCRIPTION

Figure 1:
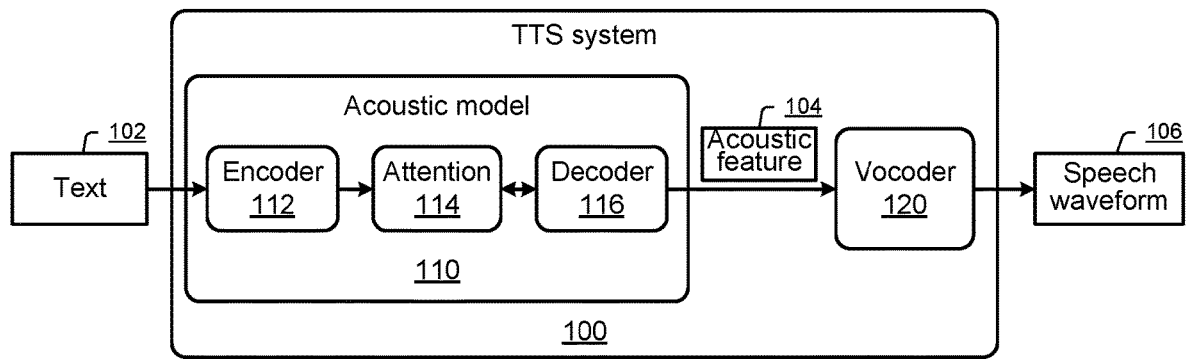
FIG. 1 illustrates an exemplary conventional end-to-end TTS system.

The present disclosure will now be discussed with reference to several example implementations. It should be understood that these implementations are discussed only for enabling those skilled in the art to better understand and thus implement the embodiments of the present disclosure, rather than suggesting any limitations on the scope of the present disclosure.

Conventional TTS systems are usually designed for synthesizing speech in an approach of exactly corresponding to an input text and in a fixed speaking style. A goal of traditional speech synthesis is usually to generate rhythm stable, accurate and fluent speech utterances for different text content. Such speech synthesis approach is more suitable for scenarios such as news reading, storytelling, etc.

However, in real life, people are more likely to speak spontaneously, and thus people's utterances are not always fluent. Especially in a conversation scenario, utterances spoken by people often comprise pauses caused by words like "um", "uh", etc., or comprise word repetitions, e.g., "I, I think", etc. For topics with different degrees of familiarity, people's utterances will also show different fluency. For example, for a familiar topic, people's speaking speed is usually faster, with fewer pauses in utterances or shorter pause durations in the utterances. When people are talking about unfamiliar topics, or when people are thinking during speaking or are uncertain about content of some narrations, there are often pauses, word repetitions, etc. in people's utterances. This type of spontaneously-spoken utterances may also be referred to as spontaneous speech. Usually, when a person produces a spontaneous speech, the person may not previously plan what he will speak, or he may simply speak out what is in his mind directly. Spontaneous speeches will generally show diversity of fluency. Speeches synthesized by the conventional TTS systems are more like non-spontaneous speeches, e.g., reading out content of an input text mechanically in a fixed fluency.

Embodiments of the present disclosure propose spontaneous TTS synthesis. According to the embodiments of the present disclosure, fluency control may be imposed in TTS synthesis to better simulate human's spontaneous speech. Fluency control may be applied to an acoustic model in a TTS system with a fluency reference factor, so that the acoustic model may generate an acoustic feature in consideration of fluency. In an aspect, adjustments related to fluency may be performed in speech synthesis. For example, pauses, word repetitions, etc. may be added to a synthesized speech. In another aspect, a preset fluency level corresponding to a domain to which a target text belongs may be considered in speech synthesis. For example, different fluency levels may be previously configured for different domains, so that synthesized speeches will also show diversity of fluency for texts in different domains.

The embodiments of the present disclosure may generate natural spontaneous speeches, so that synthesized speeches are more like real human speeches. Therefore, the performance of TTS synthesis may be significantly enhanced and the user experience may be effectively improved. The embodiments of the present disclosure may be applied to various scenarios. For example, when a TTS system according to the embodiments of the present disclosure is applied for generating speeches for a chatbot or a virtual character, speeches of the chatbot or virtual character may show different fluency for different speech contents, thereby being closer to speaking behaviors of real human beings. Moreover, through configuring the chatbot or virtual character with different fluency levels for different domains in advance, personalization of the chatbot or virtual character may be effectively enhanced.

FIG. 1 illustrates an exemplary conventional end-to-end TTS system 100.

The TTS system 100 may be configured for receiving a text 102, and generating a speech waveform 106 corresponding to the text 102. It should be understood that although it is shown in FIG. 1 that the text 102 is provided to the TTS system 100, text processing may be first performed on the text 102, e.g., converting the text 102 into a phoneme sequence, and the phoneme sequence is then provided to the TTS system 100 as an input. Herein, the input "text" may broadly refer to a text sentence, or a phoneme sequence obtained from the text, etc.

The TTS system 100 may comprise an acoustic model 110. The acoustic model 110 may predict or generate an acoustic feature 104 according to the text 102. The acoustic feature 104 may comprise various TTS acoustic features, e.g., mel-spectrum, linear spectral pair (LSP), etc. The acoustic model 110 may be based on various model architectures. The exemplary acoustic model 110 shown in FIG. 1 may be based on, e.g., the Tacotron technique, which comprises an encoder 112, an attention module 114, and a decoder 116.

The encoder 112 may convert information contained in the text 102 into a space that is more robust and more suitable for learning alignment with acoustic features. For example, the encoder 112 may convert the information in the text 102 into a state sequence in this space, which may also be referred as an encoder state or an encoder state sequence. Each state in the encoder state sequence corresponds to a phoneme, a grapheme, etc. in the text 102.

The attention module 114 may implement an attention mechanism. The attention mechanism establishes a connection between the encoder 112 and the decoder 116, to facilitate to align between text features output by the encoder 112 and acoustic features. For example, a connection between each decoding step and the encoder state may be established, and the connection may indicate each decoding step should correspond to which encoder state with what weight. The attention module 114 may take the encoder state sequence and an output from the decoder in the previous step as inputs, and generate an attention vector that represents a weight with which the next decoding step aligns with each encoder state.

The decoder 116 may map the encoder state sequence output by the encoder 112 into the acoustic feature 104 under the influence by the attention mechanism in the attention module 114. In each decoding step, the decoder 116 may take the attention vector output by the attention module 114 and an output from the decoder in the previous step as inputs, and output an acoustic feature of one or more frames, e.g., mel-spectrum.

The TTS system 100 may comprise a vocoder 120. The vocoder 120 may generate a speech waveform 106 based on the acoustic feature 104 predicted by the acoustic model 110.

It should be understood that FIG. 1 only shows an exemplary end-to-end TTS system, and there may exist various other types of TTS system. For example, instead of an acoustic model which is based on the Tacotron technique, the acoustic model 110 may also be based on any other techniques, e.g., Long Short Term Memory (LSTM) network, FastSpeech, etc. Moreover, the vocoder 120 may also be based on various techniques, e.g., WaveNet, WageGlow, etc.

Figure 2:
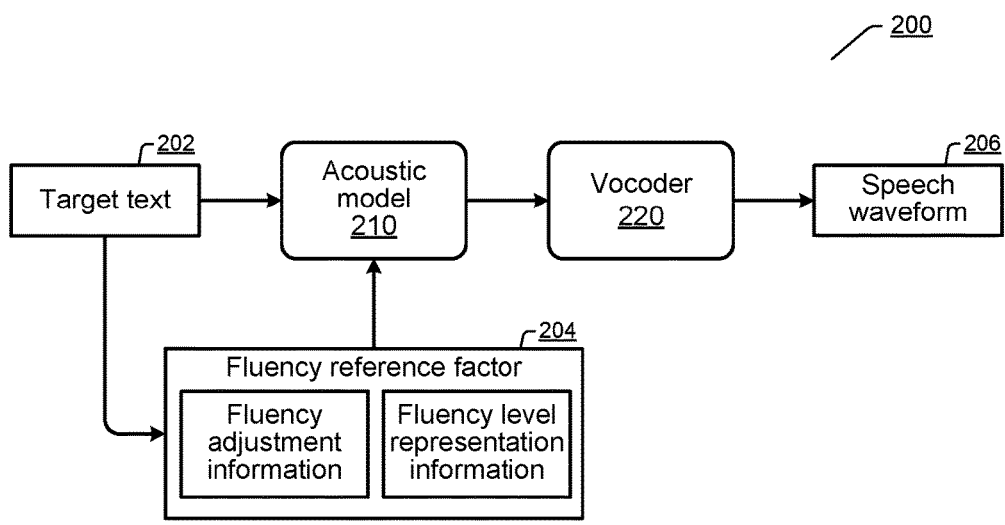
FIG. 2 illustrates an exemplary process of spontaneous TTS synthesis according to an embodiment.

FIG. 2 illustrates an exemplary process 200 of spontaneous TTS synthesis according to an embodiment. It is assumed that the process 200 intends to generate a speech waveform corresponding to a target text 202. The target text 202 may comprise, e.g., one or more characters, words, sentences, etc.

According to the process 200, a fluency reference factor 204 may be determined based at least on the target text 202. Herein, the fluency reference factor may refer to various types of information that facilitates to impose fluency control in TTS synthesis.

In an implementation, the fluency reference factor 204 may comprise fluency adjustment information. The fluency adjustment information may refer to various types of information for controlling a synthesized speech to reflect fluency. Fluency of a speech may be reflected in various aspects, e.g., filled pause, silent pause, repetition, etc. in the speech. The filled pause may refer to a pause caused by a filled word, e.g., a pause in an utterance caused by a word such as "um" and "uh". The silent pause may refer to a pause that does not contain sound wave information, e.g., a period of silence occurring in an utterance. The repetition may refer to two or more consecutive occurrences of a specific word in an utterance, e.g., the word "I" in an utterance "I, I think" is repeated twice. Filled pauses, silent pauses, repetitions, etc. in a speech will affect expression coherence, speaking speed, etc., thereby may effectively reflect fluency. The fluency adjustment information may comprise at least one of filled pause indication information, silent pause indication information, repetition indication information, etc. The filled pause indication information may indicate how to insert a filled pause in a synthesized speech, the silent pause indication information may indicate how to insert a silent pause in a synthesized speech, and the repetition indication information may indicate how to insert a repetition in a synthesized speech. Through inserting filled pauses, silent pauses, repetitions, etc. based on the fluency adjustment information in the process of synthesizing speech, effective fluency control may be achieved.

In an implementation, the fluency reference factor 204 may comprise fluency level representation information. The fluency level representation information is a representation of a fluency level of a domain to which the target text 202 belongs, e.g., an embedding representation in a latent space. The fluency level may be previously configured. Taking the application scenario of chatbot as an example, in order to enhance personalization, familiarity degrees for different domains by the chatbot may be previously specified, and fluency levels may be set accordingly. For a domain with a high familiarity degree, the chatbot's speaking fluency for content in this domain is also high. It is assumed that the fluency levels comprise three incremented levels from 1 to 3, wherein a fluency level for the domain "food" is "1", a fluency level for the domain "tourism" is "2", and a fluency level for the domain "history" is "3". For example, when a response text from the chatbot relates to the domain "history", a speech corresponding to the response text may be generated with the highest fluency, while when a response text relates to the domain "food", a speech corresponding to the response text may be generated with the lowest fluency.

In the process 200, an acoustic feature corresponding to the target text 202 may be generated at least with the fluency reference factor 204. For example, an acoustic model 210 may be adopted for generating acoustic features. The acoustic model 210 may generate an acoustic feature in consideration of at least the fluency reference factor 204. The fluency reference factor 204 may be used as a condition for acoustic feature generation, e.g., as a condition input to the acoustic model 210. Therefore, the acoustic model 210 conditioned by the fluency reference factor 204 may implement acoustic feature generation under the influence by the fluency reference factor 204. In this approach, the generated acoustic feature will be an acoustic feature on which fluency control has been imposed.

A vocoder 220 may generate a speech waveform 206 corresponding to the target text 202 based on the acoustic feature output by the acoustic model 210. The speech waveform 206 will reflect the specific fluency introduced by the previous processing, so as to better approximate human's spontaneous speech.

The above only gives an exemplary process of spontaneous TTS synthesis according to the embodiments of the present disclosure, and depending on specific application requirements and designs, the embodiments of the present disclosure may cover variations, extensions, and modifications to the process 200 in any approach. For example, the fluency reference factor 204 may comprise any one or both of the fluency adjustment information and the fluency level representation information. For example, in addition to the filled pause indication information, the silent pause indication information and the repetition indication information, the fluency adjustment information may comprise various types of other information that may be used for controlling a synthesized speech to reflect fluency. For example, in an application scenario of a chatbot or a virtual character, a fluency level may be configured by an operator or a terminal user of the chatbot or virtual character.

Figure 3:
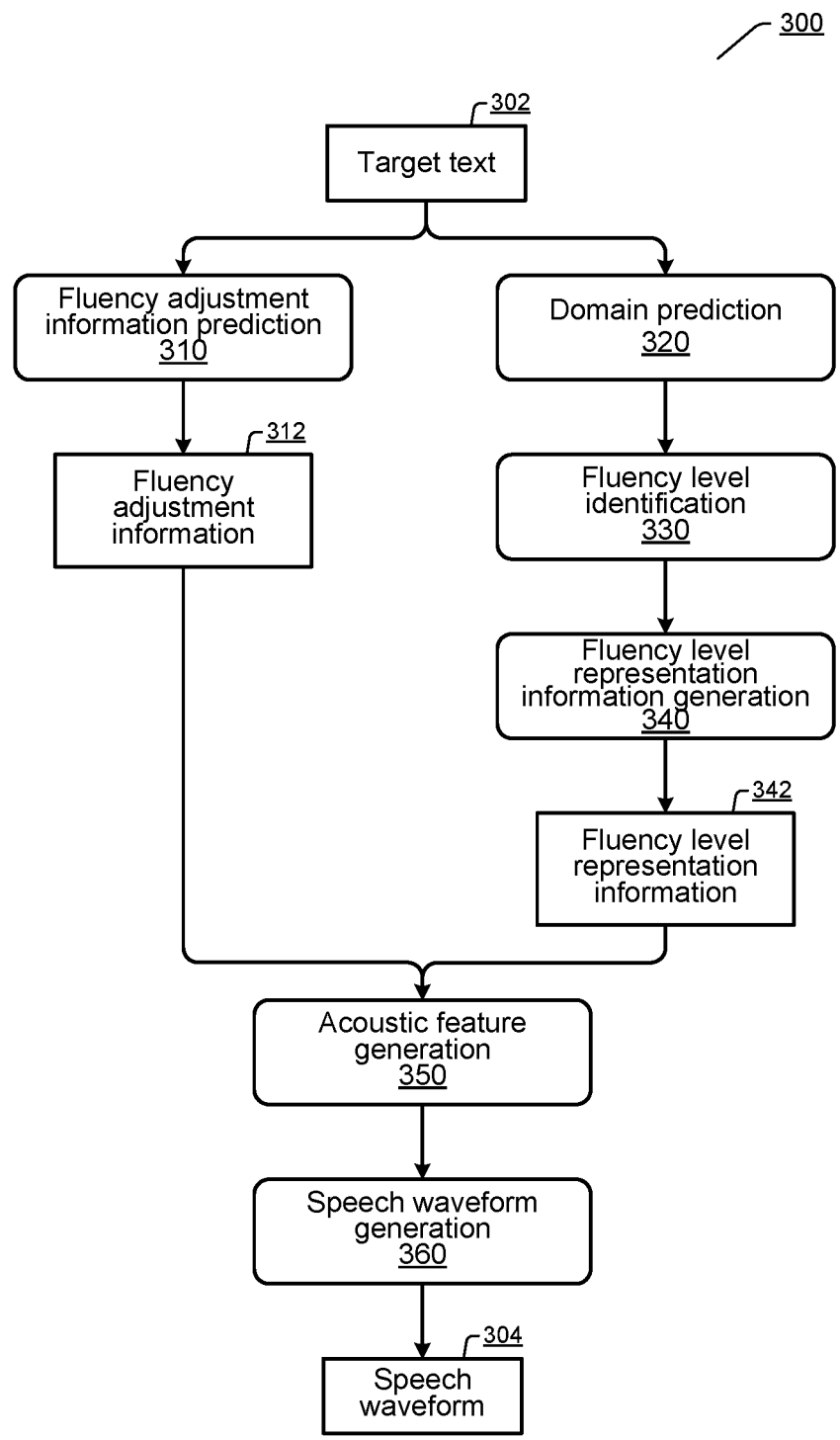
FIG. 3 illustrates an exemplary process for generating a spontaneous speech according to an embodiment.

FIG. 3 illustrates an exemplary process 300 for generating a spontaneous speech according to an embodiment. It is assumed that the process 300 intends to generate a speech waveform corresponding to a target text 302.

In different application scenarios, the target text 302 may have different meanings. For example, in an application scenario of a chatbot, the target text 302 may be a text corresponding to a response generated by the chatbot for a user query. For example, in an application scenario of a virtual character, the target text 302 may be a text corresponding to an utterance that the virtual character wants to say. For example, in an application scenario of synthesizing a lecture audio clip through simulating a specific real person's voice, the target text 302 may be a text corresponding to content in the lecture.

At 310, fluency adjustment information prediction processing may be performed for predicting fluency adjustment information 312 based at least on the target text 302. For example, the fluency adjustment information 312 may be predicted through a previously-established fluency adjustment predictor.

At 320, domain prediction processing may be performed for predicting a domain associated with the target text 302. For example, the domain may be predicted through a previously-established domain predictor. In one case, the domain associated with the target text 302 may be predicted based on the target text 302. In one case, the domain associated with the target text 302 may be predicted based on a relevant text of the target text 302. For example, in an application scenario of automated chatting, the relevant text may be a text corresponding to a query received by a chatbot from a user, meanwhile, the target text may be a text corresponding to a response generated by the chatbot for the query. In one case, the domain associated with the target text 302 may be predicted based on both the target text 302 and the relevant text of the target text 302. The process 300 may further generate fluency level representation information based at least on the predicted domain.

At 330, fluency level identification processing may be performed for identifying a fluency level corresponding to the predicted domain from a predetermined domain fluency level configuration. The domain fluency level configuration may comprise fluency levels that are preset for different domains. Thus, a corresponding fluency level may be identified through matching the domain predicted at 320 with the domain fluency level configuration.

At 340, fluency level representation information generation processing may be performed for generating fluency level representation information 342 based at least on the identified fluency level. For example, the fluency level representation information 342 may be generated with at least an embedding representation of the fluency level. Optionally, in order to be capable of considering the fluency level at a topic tier which is in a smaller granularity than the "domain", a text representation associated with the target text 302 may be further utilized when generating the fluency level representation information, wherein the text representation may represent information relevant to a topic involved in the target text 302 in a latent space. The text representation associated with the target text 302 may comprise, e.g., a representation of the target text 302 and/or a relevant text of the target text 302. Accordingly, the fluency level representation information 342 may be generated by a combination of the embedding representation of the fluency level and the text representation associated with the target text 302.

In an implementation, the fluency adjustment information prediction processing at 310 may be performed further based on the fluency level representation information 342. Therefore, the fluency adjustment information 312 may be generated in consideration of at least the fluency level corresponding to the domain to which the target text 302 belongs.

In the process 300, a fluency reference factor may be formed with the fluency adjustment information 312 and/or the fluency level representation information 342. At 350, acoustic feature generation processing may be performed so that an acoustic feature may be generated with the fluency reference factor. For example, an acoustic feature may be generated through an acoustic model conditioned by a fluency reference factor.

At 360, speech waveform generation processing may be performed for generating a speech waveform 304 corresponding to the target text 302 based on the acoustic feature obtained at 350. The speech waveform 304 will be a spontaneous speech.

It should be understood that all the processings in the above process 300 are exemplary, and depending on specific application requirements and designs, the embodiments of the present disclosure may cover any approach of changes to the process 300. For example, in the case that the fluency reference factor comprises only the fluency adjustment information 312, those processings involved in generating the fluency level representation information 342 may be omitted. For example, in the case that the fluency reference factor comprises only the fluency level representation information 342, those processings involved in generating the fluency adjustment information 312 may be omitted.

Figure 4:
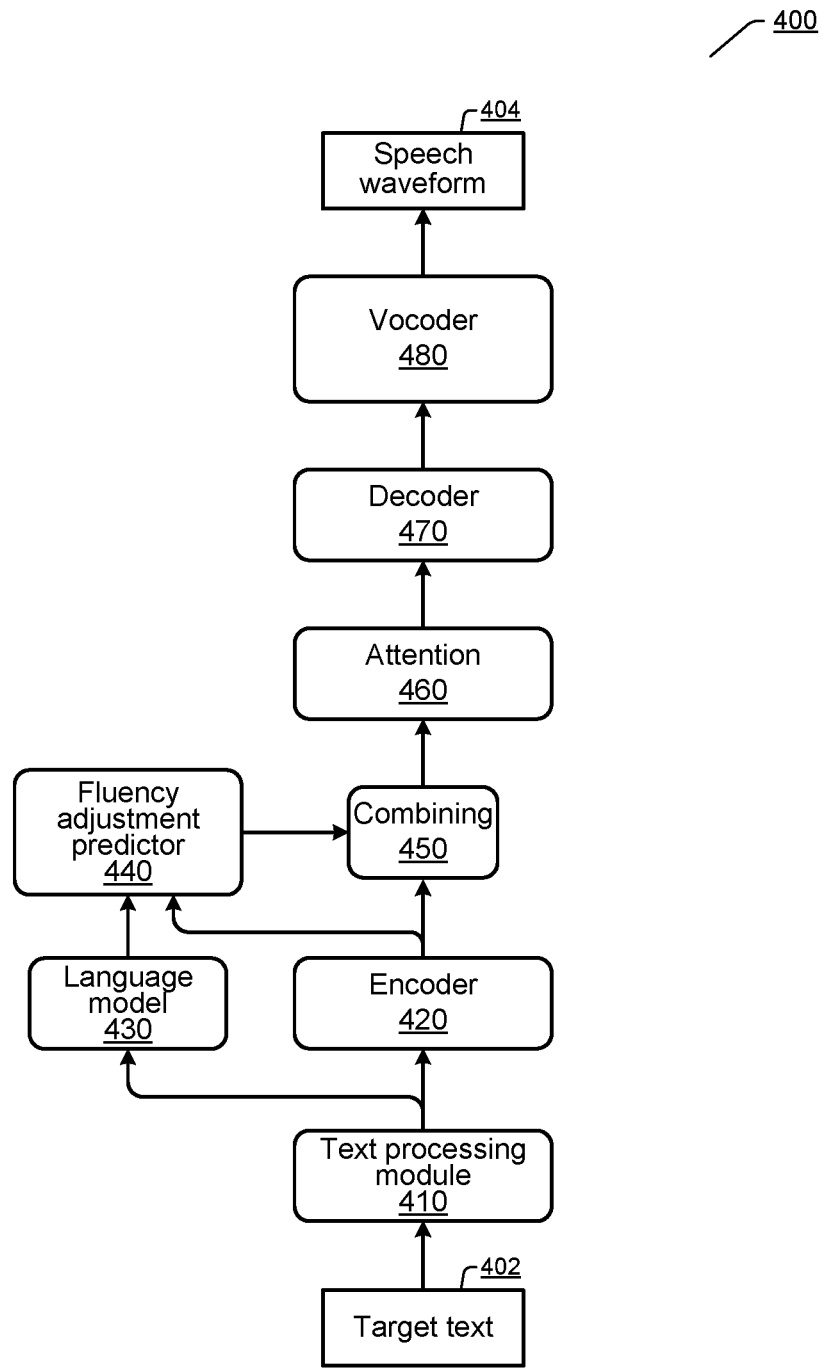
FIG. 4 illustrates an exemplary implementation of spontaneous TTS synthesis according to an embodiment.

FIG. 4 illustrates an exemplary implementation 400 of spontaneous TTS synthesis according to an embodiment. The implementation 400 is a specific example of at least a part of the process 300 in FIG. 3. In the implementation 400, speech synthesis is performed in the case that a fluency reference factor comprises only fluency adjustment information.

A target text 402 may be obtained. The implementation 400 intends to generate a speech waveform for the target text 402.

The target text 402 may be provided to a text processing module 410. The text processing module 410 may convert a grapheme sequence in the target text 402 into a phoneme sequence.

The phoneme sequence may be provided to an encoder 420 of an acoustic model, so as to generate an encoder state corresponding to the phoneme sequence, which may also be referred to as an embedding representation of the target text.

Moreover, the phoneme sequence may be provided to a language model 430. The language model 430 may be, e.g., a pre-trained BERT model for extracting intrinsic semantic relationship of a text and generating a semantic representation.

A fluency adjustment predictor 440 may predict fluency adjustment information based on the semantic representation output by the language model 430 and the encoder state output by the encoder 420. The fluency adjustment information may comprise, e.g., filled pause instruction information, silent pause instruction information, repetition indication information, etc. The filled pause indication information may indicate whether to add a filled pause after, e.g., each character, phoneme, etc.; the silent pause indication information may indicate whether to add a silent pause after, e.g., each character, phoneme, etc.; and the repetition indication information may indicate whether to repeat after, e.g., each character, phoneme, etc. In an implementation, the fluency adjustment predictor 440 may be a multi-classification task predictor which may predict two or more of filled pause indication information, silent pause indication information, and repetition indication information. In this case, the fluency adjustment predictor 440 may be constructed based on, e.g., DNN, LSTM, etc. In an implementation, the fluency adjustment predictor 440 may comprise a plurality of single classification task predictors, for predicting filled pause indication information, silent pause indication information, and repetition indication information respectively. The fluency adjustment information may be provided to the acoustic model as a condition.

At 450, the fluency adjustment information may be combined with the output of the encoder 420 to obtain a combined embedding representation. At 450, any combining approach may be adopted, e.g. cascading, adding, etc.

The combined embedding representation may be provided to an attention module 460 of the acoustic model. Furthermore, a decoder 470 of the acoustic model may generate an acoustic feature corresponding to the target text 402 under an attention mechanism provided by the attention module 460.

A vocoder 480 may generate a speech waveform 404 corresponding to the target text 402 based on the acoustic feature output by the acoustic model.

It should be understood that any process, module, etc., in the implementation 400 are exemplary, and depending on specific application requirements and designs, the embodiments of the present disclosure may cover any approach of modifications to the implementation 400. For example, although the text processing module 410 is adopted in the implementation 400 for converting the target text into the corresponding phoneme sequence, in the case that the encoder 420 supports direct processing of a text or graphemes of a text, the text processing module 410 may also be omitted. Moreover, although the implementation 400 partially adopts a network architecture that is based on the Tacotron technique, it should be understood that the embodiments of the present disclosure may also be applied to any other type of architectures in a similar approach. Moreover, it should be understood that all or a part of the modules involved in the implementation 400 may be regarded as constituting an example of a TTS system for spontaneous TTS synthesis according to the embodiments of the present disclosure.

Figure 5:
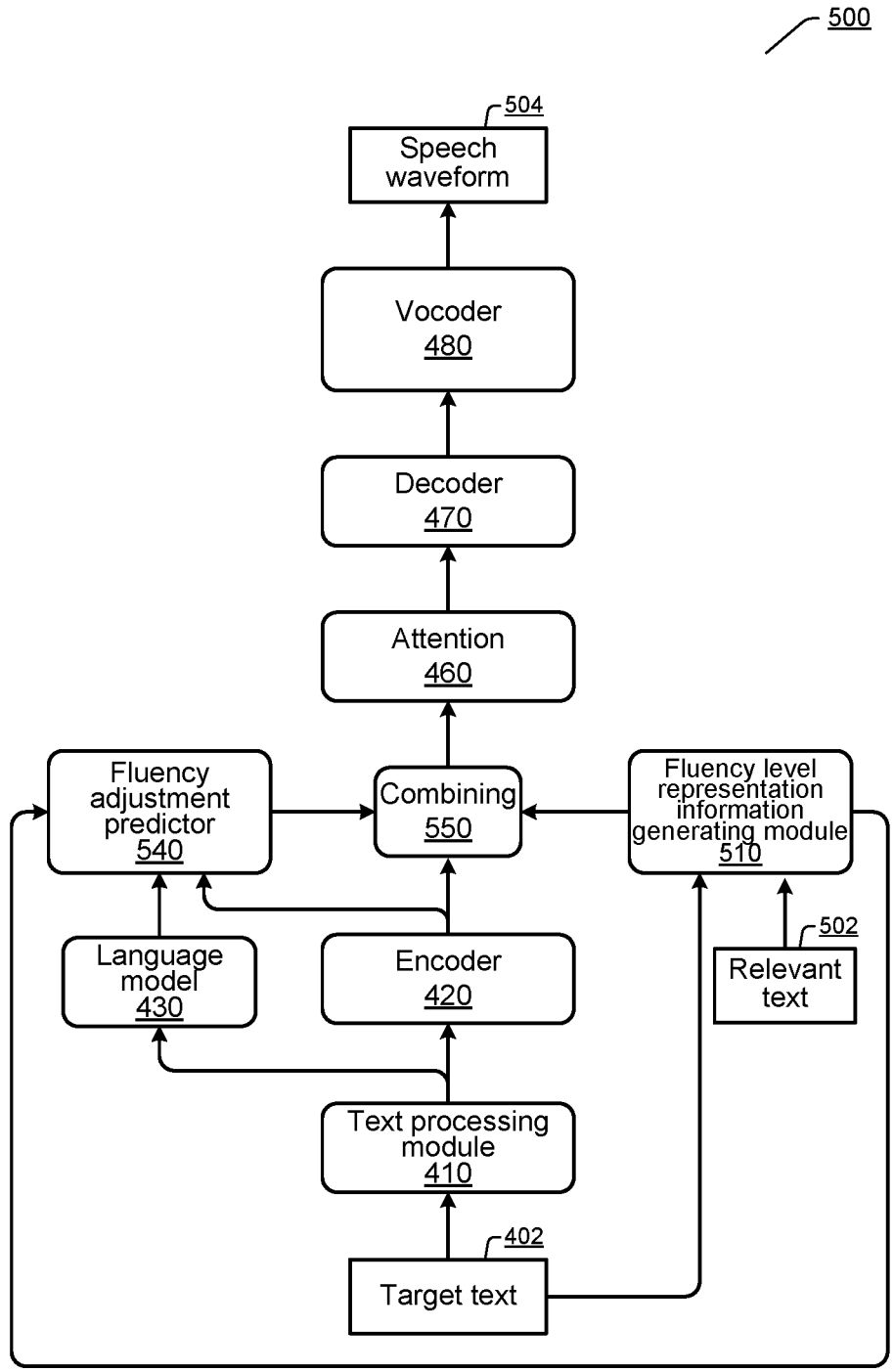
FIG. 5 illustrates an exemplary implementation of spontaneous TTS synthesis according to an embodiment.

FIG. 5 illustrates an exemplary implementation 500 of spontaneous TTS synthesis according to an embodiment. The implementation 500 is a specific example of at least a part of the process 300 in FIG. 3, and it may also be regarded as a further improvement to the implementation 400 in FIG. 4. In the implementation 500, speech synthesis is performed in the case that a fluency reference factor comprises both fluency adjustment information and fluency level representation information. The same reference numerals in FIG. 5 and FIG. 4 denote the same or similar processings or modules.

A relevant text 502 of a target text 402 may be obtained. A fluency level representation information generating module 510 may generate fluency level representation information based on the target text 402 and the relevant text 502. The fluency level representation information may be provided to an acoustic model as a further condition.

In the implementation 500, fluency adjustment information may be predicted further based on the fluency level representation information. For example, a fluency adjustment predictor 540 may predict the fluency adjustment information based on a semantic representation output by a language model 430, an encoder state output by an encoder 420, and the fluency level representation information output by the fluency level representation information generating module 510.

At 550, the fluency adjustment information output by the fluency adjustment predictor 540, the fluency level representation information output by the fluency level representation information generating module 510, and the output of the encoder 420 may be combined, so as to obtain a combined embedding representation. At 550, any combining approach may be adopted, e.g. cascading, adding, etc. The combined embedding representation may then be used for subsequent acoustic feature generation.

In the implementation 500, fluency control considers not only the fluency adjustment information, but also the fluency level representation information. It should be understood that any process, module, etc., in the implementation 500 are exemplary, and depending on specific application requirements and designs, the embodiments of the present disclosure may cover any approach of modifications to the implementation 500. For example, although the fluency level representation information generating module 510 generates the fluency level representation information based on both the target text 402 and the relevant text 502 in the implementation 500, the fluency level representation information generating module 510 may also generate the fluency level representation information based on only one of the target text 402 and the relevant text 502. Moreover, it should be understood that all or a part of the modules involved in the implementation 500 may be regarded as constituting an example of a TTS system for spontaneous TTS synthesis according to the embodiments of the present disclosure.

Figure 6:
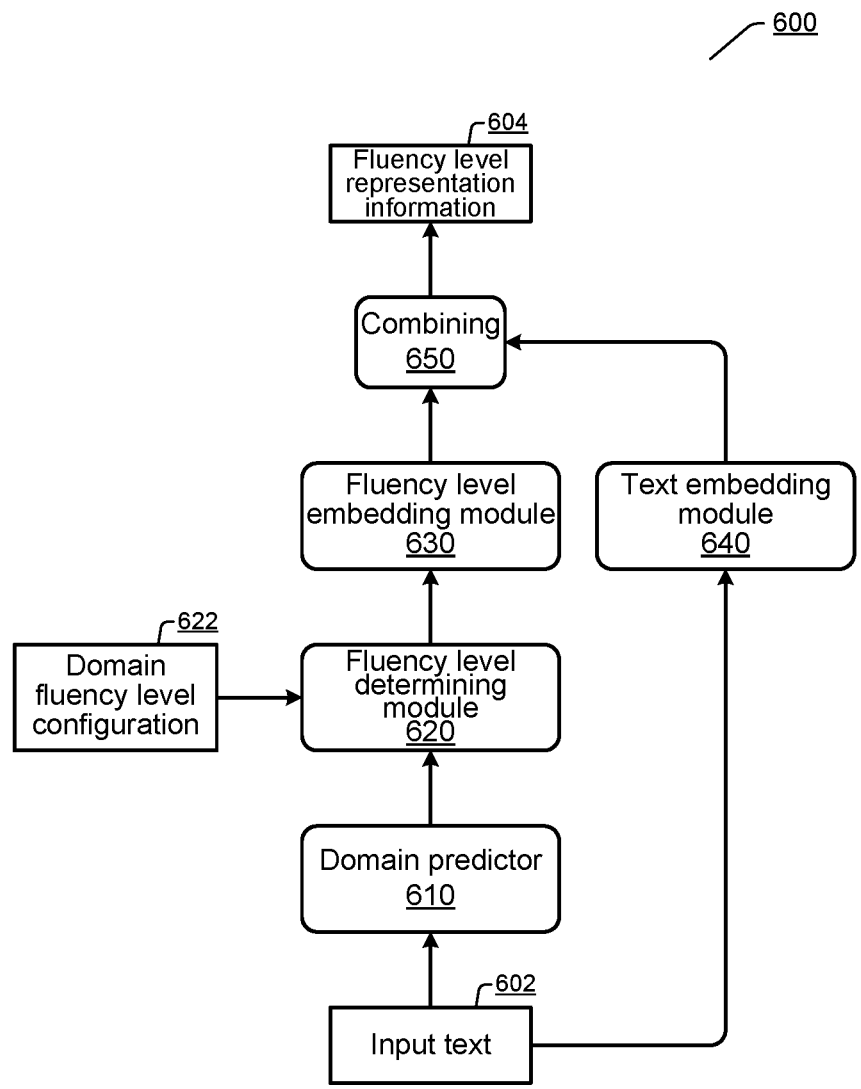
FIG. 6 illustrates an exemplary implementation of fluency level representation information generation according to an embodiment.

FIG. 6 illustrates an exemplary implementation 600 of fluency level representation information generation according to an embodiment. The implementation 600 is a specific example of the processings at 320, 330 and 340 in FIG. 3, and is a specific implementation of the fluency level representation information generating module 510 in FIG. 5. It is assumed that the implementation 600 intends to generate fluency level representation information for an input text 602, wherein the input text 602 may be a target text and/or a relevant text of the target text.

A domain associated with the input text 602 may be predicted through a domain predictor 610. For example, a plurality of domains may be previously defined, and the domain predictor 610 may be previously trained with training data in the format of <text, domain> pair. A fluency level determining module 620 may identify a fluency level corresponding to the predicted domain from a predetermined domain fluency level configuration 622. A fluency level embedding module 630 may generate a fluency level embedding representation corresponding to the identified fluency level. A text embedding module 640 may generate a text representation corresponding to the input text 602. At 650, the fluency level embedding representation output by the fluency level embedding module 630 and the text representation output by the text embedding module 640 may be combined, so as to obtain fluency level representation information 604. At 650, any combining approach may be adopted, e.g. cascading, adding, etc.

It should be understood that any process, module, etc., in the implementation 600 are exemplary, and depending on specific application requirements and designs, the embodiments of the present disclosure may cover any approach of modifications to the implementation 600. For example, although the fluency level representation information 604 is generated based on both the fluency level embedding representation and the text representation in the implementation 600, the fluency level representation information 604 may also be generated only based on the fluency level embedding representation, therefore, the text embedding module 640 may be omitted from the implementation 600.

Figure 7:
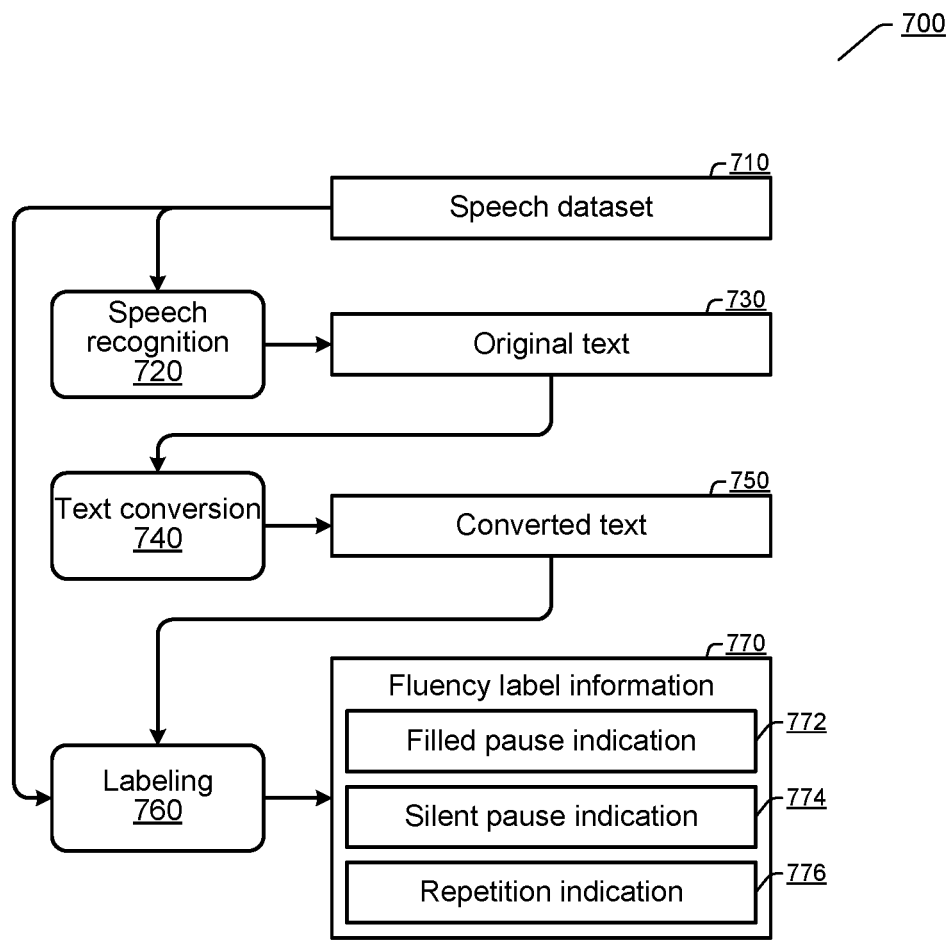
FIG. 7 illustrates an exemplary process for preparing training data according to an embodiment.

FIG. 7 illustrates an exemplary process 700 for preparing training data according to an embodiment.

A speech dataset 710 may be obtained first. The speech dataset 710 may comprise a plurality of pieces of spontaneous speech data. In an implementation, actual chatting speech records in a question answering scenario may be collected, wherein respondents' speeches may show different fluency, e.g., containing filled pauses, silent pauses, repetitions, etc., therefore, these speeches are more suitable for the training of a TTS system for spontaneous TTS synthesis according to the embodiments of the present disclosure.

At 720, speech recognition 720 may be performed on each piece of speech data in the speech dataset, so as to obtain a corresponding original text 730. The original text may comprise filled pauses, repetitions, etc. Taking an exemplary original text "Economic globalization refers to, um, the fact that the worldwide economic activities go beyond national borders, causing, causing economic activities among countries interconnected" as an example, this original text comprises a filled pause caused by the word "um" and a repetition of the word "causing".

At 740, text conversion may be performed on the original text 730, so as to obtain a converted text 750. The text conversion at 740 may be used for removing filled pauses, repetitions, etc. in the original text 730. For example, the above example of the original text may be converted into "Economic globalization refers to the fact that the worldwide economic activities go beyond national borders, causing economic activities among countries interconnected".

At 760, the converted text 750 may be labeled based on the speech data corresponding to the converted text 750, so as to obtain fluency label information 770. The fluency label information 770 may comprise a filled pause indication 772 which indicates whether there is a filled pause after each character or word in the converted text 750. The fluency label information 770 may comprise a silent pause indication 774 which indicates whether there is a silent pause after each character or word in the converted text 750. The fluency label information 770 may comprise a repetition indication 776 which indicates whether there is a repetition after each character or word in the converted text 750. The fluency label information 770 may be represented in the form of, e.g., numeric sequence. Taking the filled pause indication 772 as an example, it may be represented as a numeric sequence [0, 0, 0, 1, 0, 0, . . . ], wherein the value 0 means that there is no filled pause after the corresponding character, and the value 1 means that there is a filled pause after the corresponding character.

Through the process 700, speeches in the speech dataset 710 and corresponding converted texts as well as fluency label information may be used as training data for training a TTS system for spontaneous TTS synthesis according to the embodiments of the present disclosure. For example, the fluency label information obtained through the process 700 may be used as ground-truth data applied to a fluency adjustment predictor in the training process. Moreover, although not shown, the process 700 may further comprise labeling fluency levels of speech data. For example, fluency levels may be manually labeled, or fluency levels may be automatically labeled through a separately-trained ranking model.

It should be understood that the process 700 only shows an exemplary approach for obtaining training data, and the embodiments of the present disclosure are not limited to the approach of the process 700.

Figure 8:
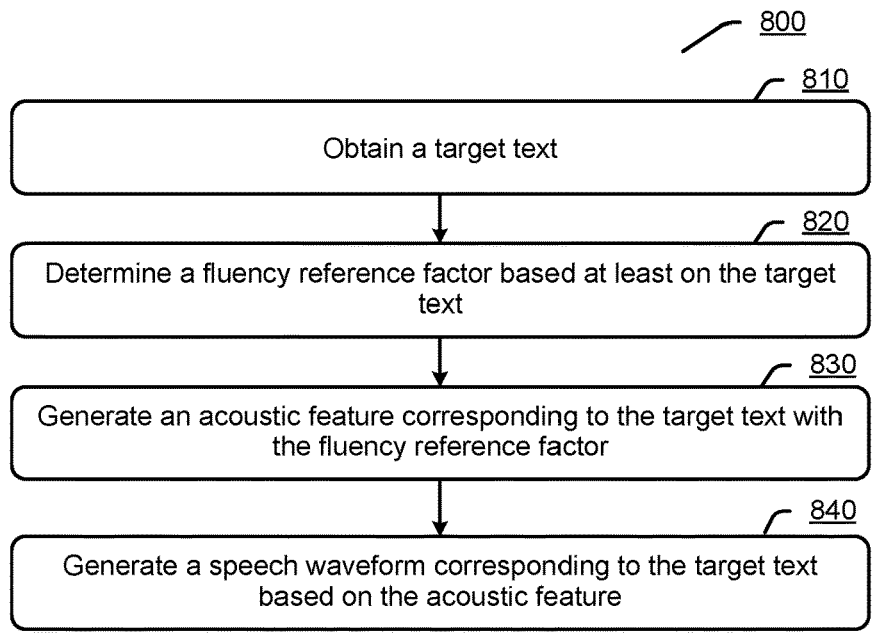
FIG. 8 illustrates a flowchart of an exemplary method for spontaneous TTS synthesis according to an embodiment.

FIG. 8 illustrates a flowchart of an exemplary method 800 for spontaneous TTS synthesis according to an embodiment.

At 810, a target text may be obtained.

At 820, a fluency reference factor may be determined based at least on the target text.

At 830, an acoustic feature corresponding to the target text may be generated with the fluency reference factor.

At 840, a speech waveform corresponding to the target text may be generated based on the acoustic feature.

In an implementation, the fluency reference factor may comprise fluency adjustment information. The determining the fluency reference factor may comprise predicting the fluency adjustment information based at least on the target text.

In an implementation, the fluency reference factor may further comprise fluency level representation information. The determining the fluency reference factor may further comprise: predicting a domain associated with the target text; and generating the fluency level representation information based at least on the domain.

The fluency adjustment information may be predicted further based on the fluency level representation information.

In an implementation, the fluency adjustment information may comprise at least one of: filled pause indication information, silent pause indication information, and repetition indication information.

In an implementation, the generating the fluency level representation information may comprise: identifying a fluency level corresponding to the domain from a predetermined domain fluency level configuration; and generating the fluency level representation information based as least on the fluency level.

In an implementation, the predicting a domain associated with the target text comprises: predicting the domain associated with the target text based on the target text and/or a relevant text of the target text.

In an implementation, the fluency level representation information may be generated further based on a text representation associated with the target text.

The text representation may comprise a representation of the target text and/or a relevant text of the target text.

In an implementation, the relevant text may be a text corresponding to a query received in an automated chatting, and the target text may be a text corresponding to a response generated for the query.

In an implementation, the fluency adjustment information may be predicted through a fluency adjustment predictor.

Training data for the fluency adjustment predictor may be obtained based at least on spontaneous speech data.

In an implementation, the generating an acoustic feature may comprise:

generating the acoustic feature through an acoustic model conditioned by the fluency reference factor.

It should be understood that the method 800 may further comprise any step/process for spontaneous TTS synthesis according to the embodiments of the present disclosure as described above.

Figure 9:
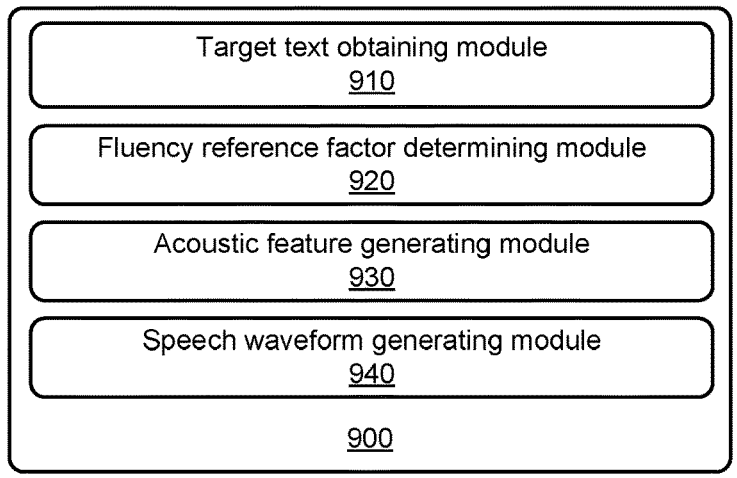
FIG. 9 illustrates an exemplary apparatus for spontaneous TTS synthesis according to an embodiment.

FIG. 9 illustrates an exemplary apparatus 900 for spontaneous TTS synthesis according to an embodiment.

The apparatus 900 may comprise: a target text obtaining module 910, for obtaining a target text; a fluency reference factor determining module 920, for determining a fluency reference factor based at least on the target text; an acoustic feature generating module 930, for generating an acoustic feature corresponding to the target text with the fluency reference factor; and a speech waveform generating module 940, for generating a speech waveform corresponding to the target text based on the acoustic feature.

In an implementation, the fluency reference factor may comprise fluency adjustment information. The fluency reference factor determining module 920 may be for: predicting the fluency adjustment information based at least on the target text.

In an implementation, the fluency reference factor may further comprise fluency level representation information. The fluency reference factor determining module 920 may be further for: predicting a domain associated with the target text; and generating the fluency level representation information based at least on the domain.

In an implementation, the fluency adjustment information may be predicted further based on the fluency level representation information.

In an implementation, the fluency adjustment information may comprise at least one of: filled pause indication information, silent pause indication information, and repetition indication information.

In an implementation, the generating the fluency level representation information may comprise: identifying a fluency level corresponding to the domain from a predetermined domain fluency level configuration; and generating the fluency level representation information based as least on the fluency level.

Moreover, the apparatus 900 may further comprise any other module that performs steps of the methods for spontaneous TTS synthesis according to the embodiments of the present disclosure as described above.

Figure 10:
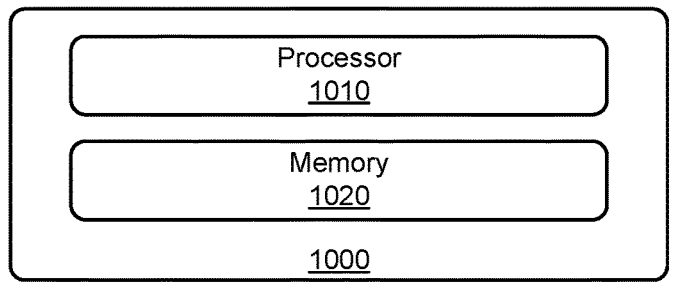
FIG. 10 illustrates an exemplary apparatus for spontaneous TTS synthesis according to an embodiment.

FIG. 10 illustrates an exemplary apparatus 1000 for spontaneous TTS synthesis according to an embodiment.

The apparatus 1000 may comprise: at least one processor 1010; and a memory 1020 storing computer-executable instructions. When the computer-executable instructions are executed, the at least one processor 1010 may: obtain a target text; determine a fluency reference factor based at least on the target text; generate an acoustic feature corresponding to the target text with the fluency reference factor; and generate a speech waveform corresponding to the target text based on the acoustic feature. Moreover, the processor 1010 may further perform any other step/process of the methods for spontaneous TTS synthesis according to the embodiments of the present disclosure as described above.

The embodiments of the present disclosure may be embodied in a non-transitory computer-readable medium. The non-transitory computer readable medium may comprise instructions that, when executed, cause one or more processors to perform any operation of the methods for spontaneous TTS synthesis according to the embodiments of the disclosure as described above.

It should be appreciated that all the operations in the methods described above are merely exemplary, and the present disclosure is not limited to any operations in the methods or sequence orders of these operations, and should cover all other equivalents under the same or similar concepts.

It should also be appreciated that all the modules in the apparatuses described above may be implemented in various approaches. These modules may be implemented as hardware, software, or a combination thereof. Moreover, any of these modules may be further functionally divided into sub-modules or combined together.

Processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in the present disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout the present disclosure. The functionality of a processor, any portion of a processor, or any combination of processors presented in the present disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, threads of execution, procedures, functions, etc. The software may reside on a computer-readable medium. A computer-readable medium may comprise, by way of example, memory such as a magnetic storage device (e.g., hard disk, floppy disk, magnetic strip), an optical disk, a smart card, a flash memory device, random access memory (RAM), read only memory (ROM), programmable ROM (PROM), erasable PROM (EPROM), electrically erasable PROM (EEPROM), a register, or a removable disk. Although a memory is shown as being separate from the processor in various aspects presented in this disclosure, a memory may also be internal to the processor (e.g., a cache or a register).

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein. All structural and functional equivalents to the elements of the various aspects described throughout the present disclosure that are known or later come to be known to those of ordinary skilled in the art are intended to be encompassed by the claims.

The invention claimed is:

1. A method for spontaneous text-to-speech (TTS) synthesis, the method comprising:
    obtaining a target text;
    determining a fluency reference factor based on at least the target text, wherein the fluency reference factor comprises fluency adjustment information and fluency level representation information, wherein determining the fluency factor comprises:
    based at least on the target text, generating, using a transformer-based language model, a vector-based semantic representation of the target text;
    predicting fluency adjustment information based at least on the semantic representation of the target text by applying a multi-classification predictor to the vector-based semantic representation to generate at least one of: filled pause indication information, silent pause indication information, and repetition indication information, wherein the filled pause indication information indicates positions to insert filled pauses in synthesized speech, the silent pause indication information indicates positions to insert silent pauses in synthesized speech, and the repetition indication information indicates positions to insert word repetitions in synthesized speech;
    predicting a domain associated with the target text based on the semantic representation of the target text, by applying a domain predictor to the vector-based semantic representation, wherein the domain predictor is trained to classify text into a plurality of predefined domains;
    identifying a fluency level corresponding to the predicted domain from a predetermined domain fluency level configuration stored in memory, wherein different domains are assigned different fluency levels based on a familiarity degree associated with each domain; and
    generating the fluency level representation information based at least on the identified fluency level and the semantic representation of the target text by combining an embedding representation of the identified fluency level with the vector-based semantic representation of the target text to generate a combined representation that captures both domain-specific fluency characteristics and semantic content of the target text; and
    generating an acoustic feature corresponding to the target text by conditioning an acoustic model with the fluency reference factor, wherein the fluency reference factor simultaneously conditions both fluency adjustment information and fluency level representation information to influence the acoustic feature generation to incorporate spontaneous speech characteristics including pauses, repetitions, and varying speaker rates based on the domain fluency level by concatenating the fluency adjustment information and the fluency level representation information with encoded linguistic features from the target text to form a joint style-linguistic sequence that is provided to a decoder of the acoustic model; and
    generating a speech waveform corresponding to the target text based on the acoustic feature using a vocoder that converts the acoustic feature into the speech waveform, the speech waveform exhibiting fluency variations characteristic of spontaneous speech.

2. The method of claim 1, wherein the predicting a domain associated with the target text comprises:
    predicting the domain associated with the target text based on the target text and/or a relevant text of the target text.

3. The method of claim 1, wherein
    the text representation comprises a representation of the target text and/or a relevant text of the target text.

4. The method of claim 2, wherein
    the relevant text is a text corresponding to a query received in an automated chatting, and
    the target text is a text corresponding to a response generated for the query.

5. The method of claim 1, wherein
    training data for the fluency adjustment predictor is obtained based at least on spontaneous speech data.

6. An apparatus for spontaneous text-to-speech (TTS) synthesis, comprising:
    a target text obtaining module, for obtaining a target text;
    a fluency reference factor determining module, for determining a fluency reference factor based at least on the target text, wherein the fluency reference factor comprises fluency adjustment information and fluency level representation information, wherein determining the fluency reference factor comprises:
    based at least on the target text, generating, using a transformer-based language model, a vector-based semantic representation of the target text;
    predicting fluency adjustment information based at least on the semantic representation of the target text by applying a multi-classification predictor to the vector-based semantic representation to generate at least one of: filled pause indication information, silent pause indication information, and repetition indication information, wherein the filled pause indication information indicates positions to insert filled pauses in synthesized speech, the silent pause indication information indicates positions to insert silent pauses in synthesized speech, and the repetition indication information indicates positions to insert word repetitions in synthesized speech;
    predicting a domain associated with the target text based on the semantic representation of the target text by applying a domain predictor to the vector-based semantic representation, wherein the domain predictor is trained to classify text into a plurality of predefined domains;
    identifying a fluency level corresponding to the predicted domain from a predetermined domain fluency level configuration stored in memory, wherein different domains are assigned different fluency levels based on a familiarity degree associated with each domain; and generating the fluency level representation information based at least on the identified fluency level and the semantic representation of the target text by combining an embedding representation of the identified fluency level with the vector-based semantic representation of the target text to generate a combined representation that captures both domain-specific fluency characteristics and semantic content of the target text; and an acoustic feature generating module, for generating an acoustic feature corresponding to the target text by conditioning an acoustic model with the fluency reference factor, wherein the fluency reference factor simultaneously conditions both fluency adjustment information and fluency level representation information to influence the acoustic feature generation to incorporate spontaneous speech characteristics including pauses, repetitions, and varying speaking rates based on the domain fluency level by concatenating the fluency adjustment information and the fluency level representation information with encoded linguistic features from the target text to form a joint style-linguistic sequence that is provided to a decoder of the acoustic model; and a speech waveform generating module, for generating a speech waveform corresponding to the target text based on the acoustic feature using a vocoder that converts the acoustic feature into the speech waveform, the speech waveform exhibiting fluency variations characteristic of spontaneous speech.

7. An apparatus for spontaneous text-to-speech (TTS) synthesis, comprising:
at least one processor; and
a memory storing computer-executable instructions that, when executed, cause the at least one processor to:
obtain a target text,
determine, based on the target text, a fluency reference factor wherein the fluency reference factor comprises fluency adjustment information and fluency level representation information wherein determining the fluency reference factor comprises:
based at least on the target text, generating, using a transformer-based language model, a vector-based semantic representation of the target text;
predicting fluency adjustment information based at least on the semantic representation of the target text by applying a multi-classification predictor to the vector-based semantic representation to generate at least one of: filled pause indication information, silent pause indication information, and repetition indication information, wherein the filled pause indication information indicates positions to insert filled pauses in synthesized speech, the silent pause indication information indicates positions to insert silent pauses in synthesized speech, and the repetition indication information indicates positions to insert word repetitions in synthesized speech;
predicting a domain associated with the target text based on the semantic representation of the target text by applying a domain predictor to the vector-based semantic representation, wherein the domain predictor is trained to classify text into a plurality of predefined domains;
identifying a fluency level corresponding to the predicted domain from a predetermined domain fluency level configuration stored in memory, wherein different domains are assigned different fluency levels based on a familiarity degree associated with each domain; and
generating the fluency level representation information based at least on the identified fluency level and the semantic representation of the target text by combining an embedding representation of the identified fluency level with the vector-based semantic representation of the target text to generate a combined representation that captures both domain-specific fluency characteristics and semantic content of the target text; and
generate an acoustic feature corresponding to the target text by conditioning an acoustic model with the fluency reference factor, wherein the fluency reference factor simultaneously conditions both fluency adjustment information and fluency level representation information to influence the acoustic feature generation to incorporate spontaneous speech characteristics including pauses, repetitions, and varying speaking rates based on the domain fluency level by concatenating the fluency adjustment information and the fluency level representation information with encoded linguistic features from the target text to form a joint style-linguistic sequence that is provided to a decoder of the acoustic model; and
generate a speech waveform corresponding to the target text based on the acoustic feature using a vocoder that converts the acoustic feature into the speech waveform, the speech waveform exhibiting fluency variations characteristic of spontaneous speech.

* * * * *